United States Patent
Sakanaka (10) Patent No.: US 7,058,307 B2
(45) Date of Patent: Jun. 6, 2006

(54) FREE-SPACE OPTICAL COMMUNICATION APPARATUS AND FREE-SPACE OPTICAL COMMUNICATION SYSTEM

(75) Inventor: Tetsuo Sakanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 10/226,320

(22) Filed: Aug. 23, 2002

(65) Prior Publication Data

US 2003/0044636 A1 Mar. 6, 2003

(30) Foreign Application Priority Data

Sep. 3, 2001 (JP) .............................. 2001-265672

(51) Int. Cl.
*H04B 10/00* (2006.01)

(52) U.S. Cl. .................... 398/119; 398/118; 398/120; 398/122; 398/123; 398/124; 398/128; 398/129; 398/130; 398/131; 398/135; 398/136; 398/137

(58) Field of Classification Search ................ 398/118, 398/119, 120, 124, 128, 130, 131, 135, 136, 398/137, 70, 71, 72, 122, 123, 129
See application file for complete search history.

(56) References Cited

U.S. PATENT DOCUMENTS

| | | | |
|---|---|---|---|
| 5,500,754 A | 3/1996 | Orino et al. | |
| 5,530,577 A | 6/1996 | Orino et al. | |
| 5,594,580 A | 1/1997 | Sakanaka et al. | |
| 5,610,748 A | 3/1997 | Sakanaka et al. | |
| 5,627,669 A | 5/1997 | Orino et al. | |
| 5,680,241 A | 10/1997 | Sakanaka et al. | |
| 6,335,811 B1 | 1/2002 | Sakanaka | |
| 6,650,451 B1 * | 11/2003 | Byers et al. | ................. 398/129 |

FOREIGN PATENT DOCUMENTS

| | | |
|---|---|---|
| EP | 1 054 520 | 11/2000 |
| JP | 2000-224112 | 8/2000 |

* cited by examiner

*Primary Examiner*—Hanh Phan
(74) *Attorney, Agent, or Firm*—Fitzpatrick, Cella, Harper & Scinto (57) ABSTRACT

A free-space optical communication apparatus includes a storage unit which stores angle-setting information for the mirror for communicating with each of the plurality of other apparatuses, a mirror driving unit which drives the mirror to an angle corresponding to the stored angle-setting information, an optical detecting unit which, on one occasion for communicating with a specified communication apparatus among the plurality of other apparatuses, detects the incident state of an optical beam sent from the specified apparatus, and a control unit which, based on the detected incident state of the optical beam, determines angle-correcting information for correcting the stored angle-setting information for the specified apparatus, and which, on the next occasion for communicating with the specified apparatus, uses the mirror driving unit to drive the mirror to an angle corresponding to the angle-setting information corrected by the angle-correcting information.

9 Claims, 4 Drawing Sheets

FREE-SPACE OPTICAL COMMUNICATION APPARATUS AND FREE-SPACE OPTICAL COMMUNICATION SYSTEM

BACKGROUND OF THE INVENTION

1. Field of the Invention

The present invention relates to a free-space optical communication system in which an optical beam transmitted in free space is used to perform wireless communication between a free-space optical communication apparatus provided at one point and other free-space optical communication apparatuses provided at a plurality of points.

2. Description of the Related Art

Figure 5:
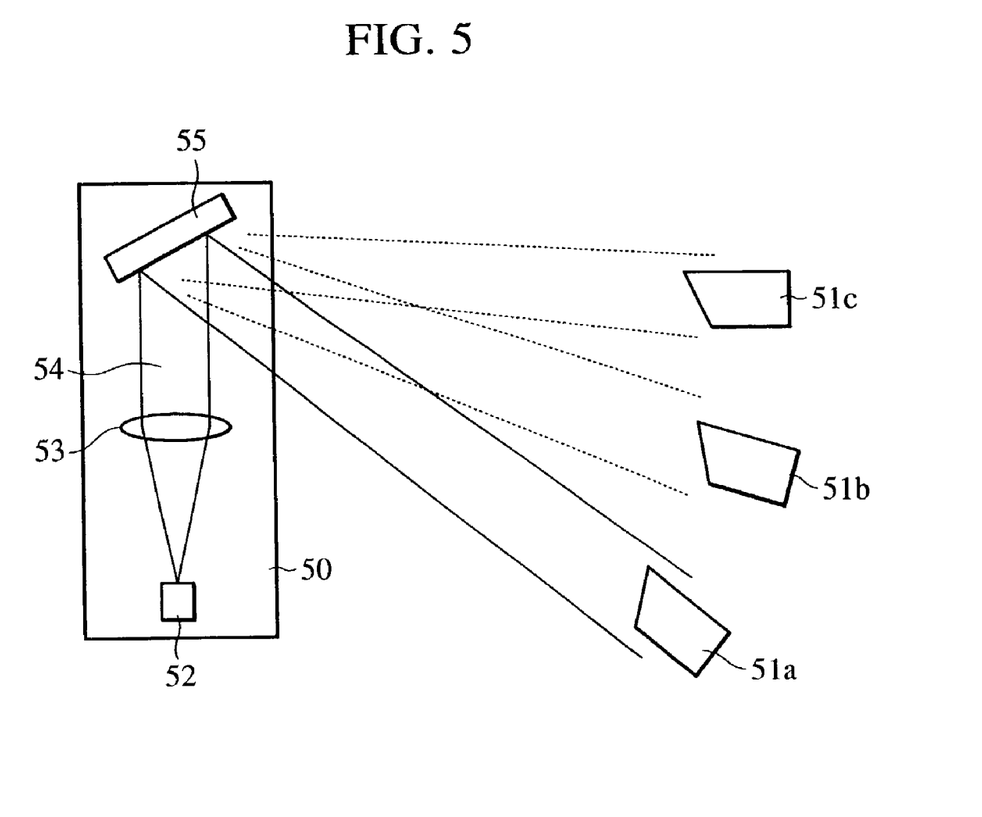
FIG. 5 is a sectional view showing a free-space optical communication system of the related art.

The system shown in FIG. 5 has been proposed as the above type of free-space optical communication system that uses an optical signal to perform wireless communication. The system in FIG. 5 performs optical communication between a central base 50 provided at a point and individual communication apparatuses 51a to 51c provided at a plurality of remote points.

Referring to FIG. 5, an optical signal emitted from a light source 52 in the central base 50 is converted into a slightly broadened parallel optical beam 54 by an optical system 53. In the central base 50, the rotational position of a movable mirror 55 is set at an angle that enables optical beam transmission to one of the communication apparatuses 51a to 51c, and optical beam transmission is performed by using the movable mirror 55 to reflect the optical beam to that apparatus.

This system sequentially scans the optical beam over the communication apparatuses 51a to 51c for communication by changing the angle of the movable mirror 55 in a predetermined order and in accordance with predetermined angles in such a way that, upon termination of transmission to the communication apparatus 51a, the mirror 55 is driven to an angle for transmission to the communication apparatus 51b and, upon termination of transmission to the communication apparatus 51b, the mirror 55 is driven to an angle for transmission to the communication apparatus 51c.

The scanning is performed at high speed so that the user of each communication apparatus is not aware of any delay, particularly when the apparatus receives a signal.

In addition, the optical signal can carry data at high speed because it has no frequency range limitation, as in radio waves. Thus, the optical signal enables communication with sufficient data capacity, even in intermittent transmission using sequential scanning.

Japanese Patent Laid-Open No. 2000-224112 proposes a base apparatus which includes a light source and an optical detector and which uses a mirror to scan each communication apparatus and which performs bidirectional communication with the communication apparatus.

Also, in Japanese Patent Laid-Open No. 2000-224112, in order to prevent the optical beam from being deflected by a change in the posture and angle of the base apparatus as a result of base or building deformation caused by wind, vibrations, or temperature changes, optical-beam-direction correcting functions have also been proposed. In these functions, an accelerometer and a temperature sensor are used for correction, and five arranged photodiodes are used to correct the direction of the optical beam from the output of each photodiode.

In order to increase the reliability of free-space optical communication as described above, it is preferable for the base apparatus to have an automatic beam-tracking function in which, if the base or the building is inclined, the mirror angle is feedback-controlled so that the optical beam can be emitted towards the communication apparatus by always detecting the direction of the communication apparatus.

Among the above systems of the related art, the optical-beam-direction correcting system including an accelerometer and a temperature sensor does not directly correct the direction of the emerging optical beam by performing automatic tracking. Accordingly, the relationship between the output of the accelerometer or temperature sensor and correction in the optical beam direction differs depending on certain conditions such as the location, the base, and the building structure. Thus, it is impossible to ensure the correction.

Among the above systems of the related art, the optical-beam-direction correcting system including five arranged photodiodes has a problem in that, when scanning the communication apparatuses, it is impossible to perform the scanning at high speed, and therefore each communication apparatus is prevented from being aware of a delay because a long time is required to perform the steps of directing the mirror to a specified communication apparatus, reading the outputs of the five photodiodes, performing arithmetic operations, and correcting the optical beam direction by driving the mirror again.

SUMMARY OF THE INVENTION

To solve the above problems, according to an aspect of the present invention, a free-space optical communication apparatus for selectively performing wireless optical communication with a plurality of other free-space optical communication apparatuses by changing the angle of an light-beam reflecting mirror is provided. The free-space optical communication apparatus includes a storage unit which stores angle-setting information for the mirror for communicating with each of the plurality of other apparatuses, and a mirror driving unit which drives the mirror to an angle corresponding to the stored angle-setting information. The apparatus also includes an optical detecting unit which, on one occasion for communicating with a specified communication apparatus among the plurality of other apparatuses, detects the incident state of an optical beam sent from the specified apparatus, and a control unit which, based on the detected incident state of the optical beam, determines angle-correcting information for correcting the stored angle-setting information for the specified apparatus, and which, on the next occasion for communicating with the specified apparatus, uses the mirror driving unit to drive the mirror to an angle corresponding to the angle-setting information corrected by the angle-correcting information.

Preferably, when the angle-correcting information represents an amount of correction which is out of a predetermined range, the control unit controls the mirror-driving unit to drive the mirror to the angle corresponding to the angle-setting information corrected by the angle-correcting information on the one occasion for communicating with the specified apparatus.

The optical detecting unit may detect, with respect to a predetermined reference position, a position at which the optical beam sent from the specified apparatus is incident.

The control unit may control the mirror driving unit to drive the mirror so that the free-space optical communication apparatus can communicate with the plurality of other apparatuses cyclically or in a predetermined order.

According to the present invention, on one occasion for communication between an free-space optical communication apparatus communicates with other free-space optical communication apparatuses, the time required for correcting the angle of an optical-beam reflecting mirror can be excluded, and the user of each of the apparatuses can be prevented from being aware of a delay. In addition, on the next occasion for the communication, optical communication can be performed, with the angle of the mirror corrected in accordance with the positional relationship between the apparatus and the other apparatuses.

When angle-setting information represents a value out of a predetermined range, by controlling a mirror driving unit to drive the mirror to an angle corresponding to angle-setting information corrected by the angle-setting information on one occasion for commutating with a specified apparatus among the other apparatuses, the angle of the mirror can immediately be corrected in that occasion, even if there is a possibility that the communication may not be maintained due to a large change in the posture of the apparatus.

According to another aspect of the present invention, a free-space optical communication apparatus for selectively performing wireless optical communication with a plurality of other free-space optical communication apparatuses by changing the angle of an optical-beam reflecting mirror is provided. The free-space optical communication apparatus includes a storage unit which stores angle-setting information for the mirror for communicating with each of the plurality of other apparatuses, a mirror driving unit which drives the mirror to an angle corresponding to the stored angle-setting information, and an optical detecting unit which, on one occasion for communicating with a specified communication apparatus among the plurality of other apparatuses, detects the incident state of an optical beam sent from the specified apparatus. The apparatus also includes a control unit which, based on the detected incident state of the optical beam, determines angle-correcting information for correcting the stored angle-setting information for the specified apparatus, and which, on the next occasion for communicating with the specified apparatus, uses the mirror driving unit to drive the mirror to an angle corresponding to the angle-setting information corrected by the angle-correcting information. The control unit has a first control mode in which, on the one occasion for communicating with the specified apparatus, the mirror driving unit is controlled to drive the mirror to an angle corresponding to the angle-setting information corrected by the angle-correcting information, and a second control mode in which, on the next occasion for communicating with the specified apparatus, the mirror driving unit is controlled to drive the mirror to an angle corresponding to the angle-setting information corrected by the angle-correcting information.

The optical detecting unit may detect, with respect to a predetermined reference position, a position at which the optical beam sent from the specified apparatus is incident.

The control unit may control the mirror driving unit to drive the mirror so that the free-space optical communication apparatus can communicate with the plurality of other apparatuses cyclically or in a predetermined order.

According to the present invention, higher priority can freely be given either on the use of the first control mode to always communicate with each user at the optimal mirror angle, or on the use of the second control mode to perform high speed scanning without preventing each user from being aware of delay This enhances flexibility in operating the free-space optical communication system.

According to another aspect of the present invention, a free-space optical communication system is provided which includes one of the free-space optical communication apparatuses, and a plurality of other apparatuses with which the free-space optical communication apparatus can communicate by using an optical beam.

Further objects, features, and advantages of the present invention will become apparent from the following description of the preferred embodiments with reference to the attached drawings.

DESCRIPTION OF THE PREFERRED EMBODIMENTS

First Embodiment

Figure 1:
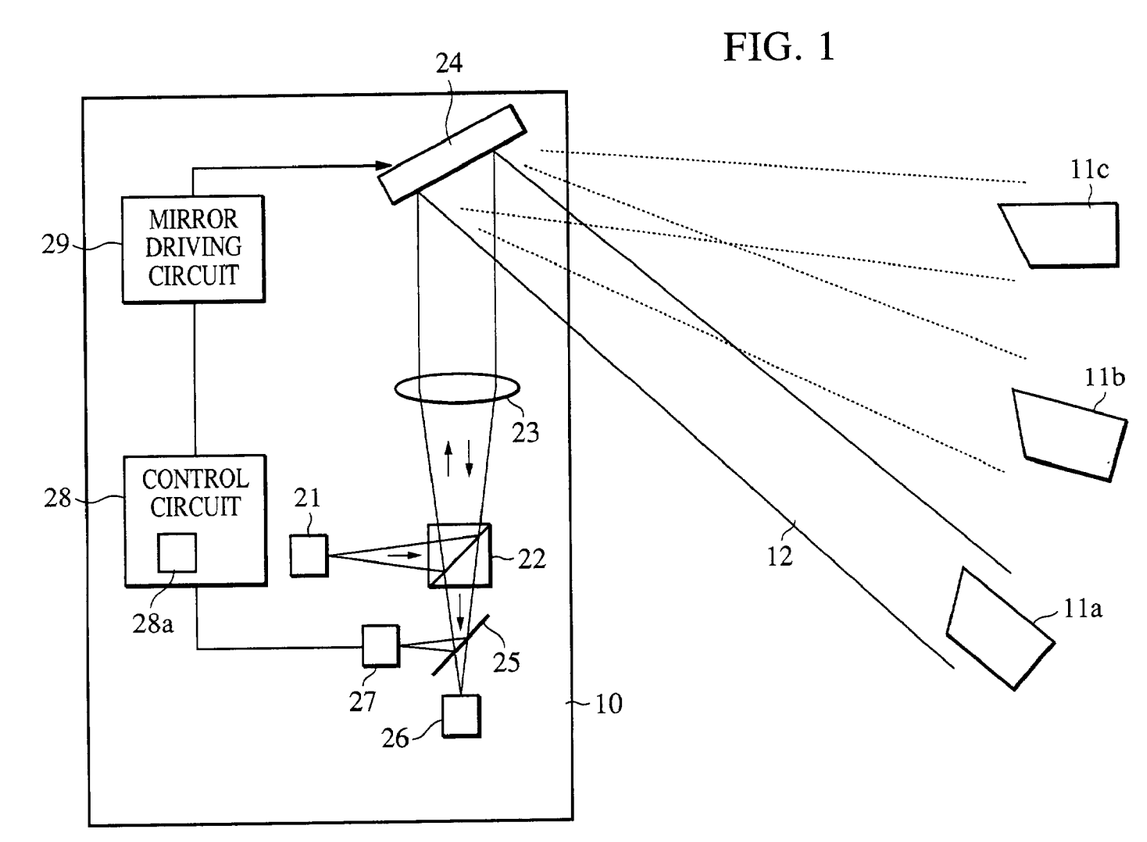
FIG. 1 is a block diagram showing a free-space optical communication system according to a first embodiment of the present invention.

FIG. 1 shows the configuration of a free-space optical communication system according to a first embodiment of the present invention. This system includes a base apparatus 10 (free-space optical communication system). The base apparatus 10 sequentially scans an optical beam 12 over a plurality of other communication apparatuses 11a, 11b, and 11c, and performs bidirectional wireless communication with each of the communication apparatuses 11a, 11b, and 11c.

In the first embodiment, the communication apparatuses 11a to 11c are cyclically scanned in the order of the apparatus 11a, the apparatus 11b, the apparatus 11c, the apparatus 11a, . . . , in such a way that the apparatus 10 initiates communication with the apparatus 11b when ending communication with the apparatus 11a, and initiates communication with the apparatus 11c when ending communication with the apparatus 11b.

However, any scanning order may be used in the present invention. The present invention may use reciprocated scanning having scanning order of the apparatus 11a, the apparatus 11b, the apparatus 11c, the apparatus 11b, and the apparatus 11a, and the apparatus 10 may sequentially be scanned by each apparatus from which a communication request is sent through a communication link (not shown).

In FIG. 1, the optical signal from the apparatus 10 is emitted by a light emitting device 21 such as a semiconductor laser. The beam of the semiconductor laser is polarized and is set in the first embodiment so that the polarization direction of the semiconductor laser is parallel to the surface of FIG. 1.

The beam polarized in the set direction is reflected towards a transmitting/receiving lens 23 by a polarizing beam splitter 22. The reflected beam passes through the transmitting/receiving lens 23 to become the optical beam 12 as a slightly broadened parallel beam, and is incident on a movable mirror 24.

The optical beam 12 incident on the movable mirror 24 is emitted to a specified apparatus among the apparatuses 11a to 11c in accordance with the angle of the movable mirror 24.

In addition, an optical beam emitted from each of the apparatuses 11a to 11c reversely passes on an optical axis similar to that for the optical beam 12 emitted from the apparatus 10, and is reflected by the movable mirror 24. The reflected beam is incident on the polarizing beam splitter 22 through the transmitting/receiving lens 23.

The optical beam emitted from each of the apparatuses 11a to 11c has a polarization direction set to be perpendicular to the surface of FIG. 1. Accordingly, the optical beam passes through the polarizing beam splitter 22 and is incident on the beam splitter 25. Most of the optical beam incident on the beam splitter 25 passes through it and is incident on an optical-signal-detecting photoreceptor device 26. The photoreceptor device 26 photoelectrically converts the incident beam into a signal for communication.

Part of the optical beam incident on the beam splitter 25 is reflected by it and is incident on an optical position detector (optical detecting means) 27.

Figure 4:
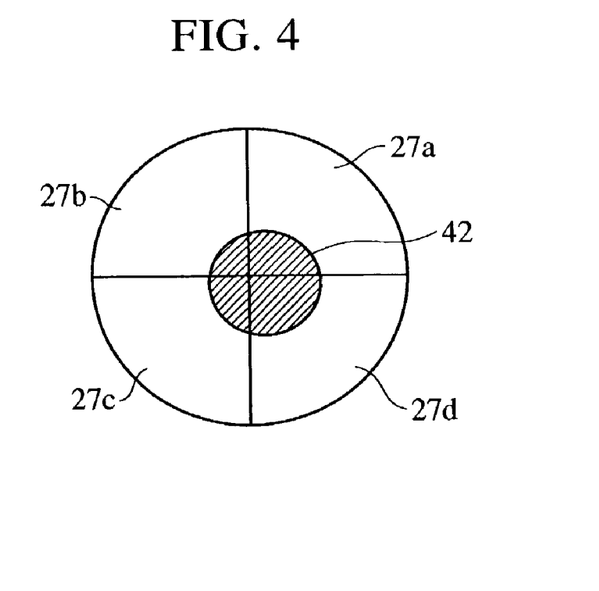
FIG. 4 is an illustration of an optical position detector used in the base apparatus shown in FIG. 3.

As FIG. 4 shows, the optical detector 27 consists of quarter photodiodes 27a to 27d. FIG. 4 shows that the spot 42 of the optical beam impinges in a position slightly shifted from the central position (predetermined reference position) of the photodiodes 27a to 27d. By comparing the outputs of the photodiodes 27a to 27d, the position (incident state) of the beam spot 42 can be found.

A signal from the optical position detector 27 is input to a control circuit 28. The optical position detector 27 calculates the position of the beam spot 42 with respect to the reference position by comparing the outputs of the photodiodes 27a to 27d. Also, based on the direction of a shift between both positions, the amount of the shift, etc., the optical position detector 27 calculates correction information (angle-correcting information) for angle-setting information (stored in a memory 28a in the control circuit 28) for controlling the angle of the movable mirror 24. The correction information is used to drive the mirror 24 in a direction in which the beam spot 42 is in the center of the optical position detector 27 and the outputs of the photodiodes 27a to 27d are all equal.

In the control circuit 28, the angle-setting information stored in the memory 28a is updated by using the calculated correction information to correct the stored angle-setting information, and the updated angle-setting information is stored as new angle-setting information.

In response to a driving signal which is based on the angle-setting information stored in the memory 28a and which is output from the control circuit 28, a mirror driving circuit 29 drives the mirror 24 so that the angle of the mirror 24 is changed.

The optical position detector 27, the light emitting device 21, and the optical-signal-detecting photoreceptor device 26 are adjusted in position so that their optical axes match one another. In a state in which the beam spot 42 impinges in the center of the optical position detector 27, a beam is incident on the photoreceptor device 26 in its center, and the center of a beam from the light emitting device 21 is also directed towards one of the apparatuses 11a to 11c.

Figure 2:
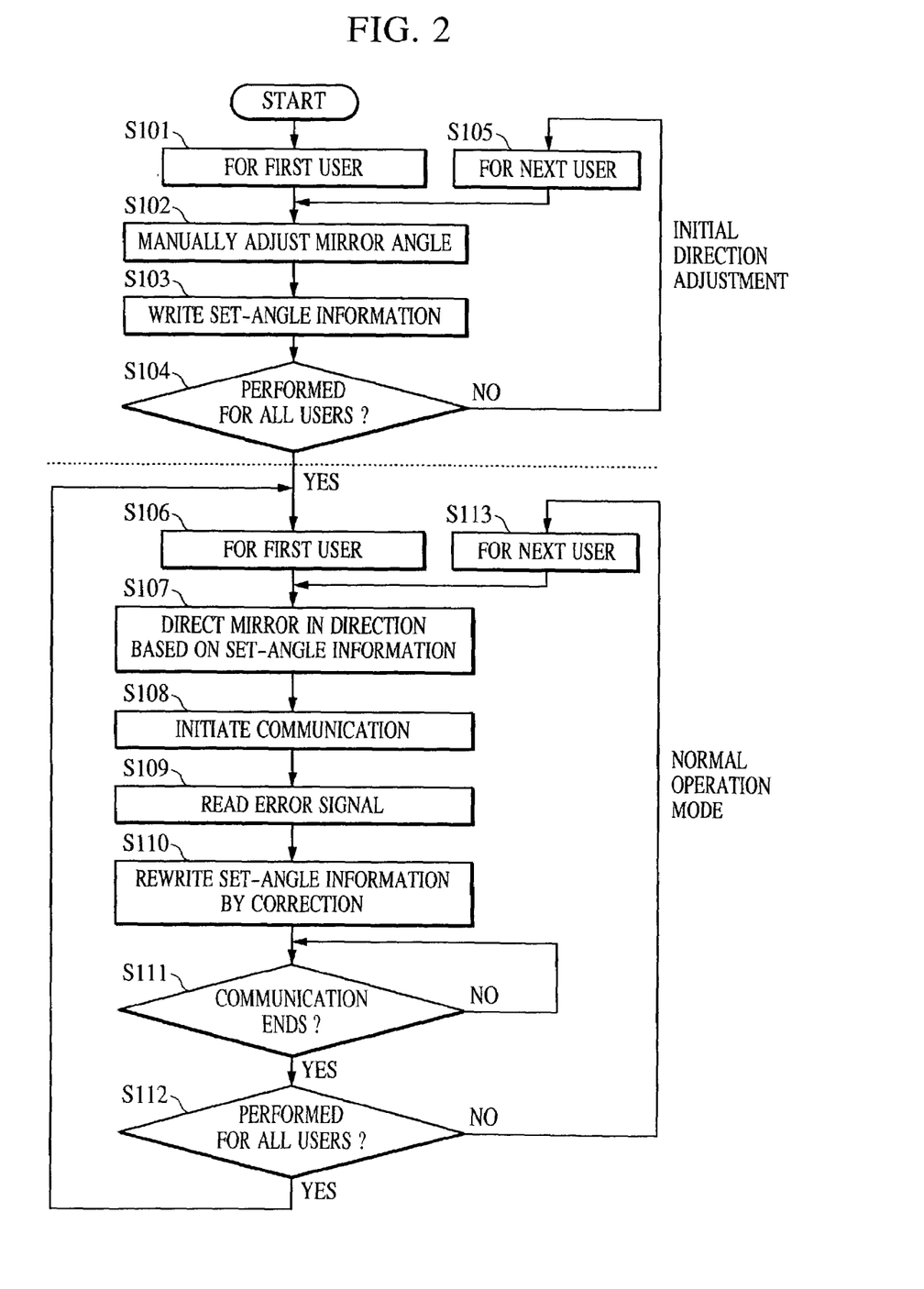
FIG. 2 is a flowchart showing a control process performed by a base apparatus included in the free-space optical communication system shown in FIG. 1.

FIG. 2 is a flowchart showing a control process performed by the base apparatus (mainly the control circuit 28).

The signal from the optical position detector 27 represents the direction and amount of a shift from the center of the beam spot 42, and is hereinafter referred to as the "error signal". In addition, the communication apparatuses 11a to 11c correspond in usage form to users in communication. Accordingly, the apparatuses 11a to 11c are hereinafter referred to as the "first to third users".

Initial setting on the angle of the mirror 24 is performed by, for each user, manually adjusting the angle of the mirror 2 (steps S101 to S105). By receiving the optical signal for each user at a certain level by manually adjusting the mirror angle, the operation of an automatic beam-tracking function (described later) accurately directs the optical beam to each user. Angle-setting information corresponding to the mirror angle, obtained when the optical signal can be received at a certain level by manually adjusting the mirror angle, is written for each user in the memory 28a in the control circuit 28.

After the above initial setting ends, the control process proceeds to steps for a normal operation mode. First, by outputting a driving signal to the mirror driving circuit 29 in order to set the mirror 24 at an angle corresponding to the angle-setting information stored in the memory 28a, the control circuit 28 drives the mirror 24 at the angle and directs the optical beam 12 to the first user before initiating communication (steps S106 to S108).

At the same time, the control circuit 28 controls the optical position detector 27 to detect the position of the spot of the optical beam sent from the first user (step S109). The control circuit 28 calculates correction information based on an error signal from the optical position detector 27, and rewrites the angle-setting information stored in the memory 23a into new angle-setting information by using the correction information to correct the angle-setting information (step S110).

After communication with the first user ends (step S111), the mirror 24 is driven to an angle corresponding to the second user and communication with the second user is initiated (steps S112, and S113 to S111). After the apparatus 10 communicates with the third user, the fourth user, etc., and cyclically communicates with all the users (step S112), the apparatus 10 scans the first user again (step S106) and repeatedly performs the steps in the normal operation mode.

When the first user is scanned again, the control circuit 28 drives the mirror 24 based on the angle-setting information corrected in the previous scanning (step S107). Accordingly, the optical beam 12 is directed to the first user with more accuracy than that in the previous scanning, and an optical beam from the first user is also incident on the photoreceptor device 26 in a position closer to its center. This also applies to the other users.

By repeatedly performing the control process, the optical beam 12 is always directed to each user with accuracy, even if the posture or angle of the base apparatus 10 are changed by deformation due to a shake caused by wind or vibrations of a base in which the apparatus 10 is set or vibrations of a building in which the base is installed, or due to deformation caused by a temperature change. Thus, a state in which automatic tracking of each user is substantially performed although it is time divisional is obtained.

In the first embodiment, the apparatus 10 does not communicate with other apparatuses while automatically following each of the other apparatuses, but performs only correction of angle-setting information based on an error signal when performing communication, and performs the next scanning based on the angle-setting information corrected in the previous scanning. Therefore, high speed scanning can be performed, so that a delay can be reduced, even if the number of users increases.

Second Embodiment

Figure 3:
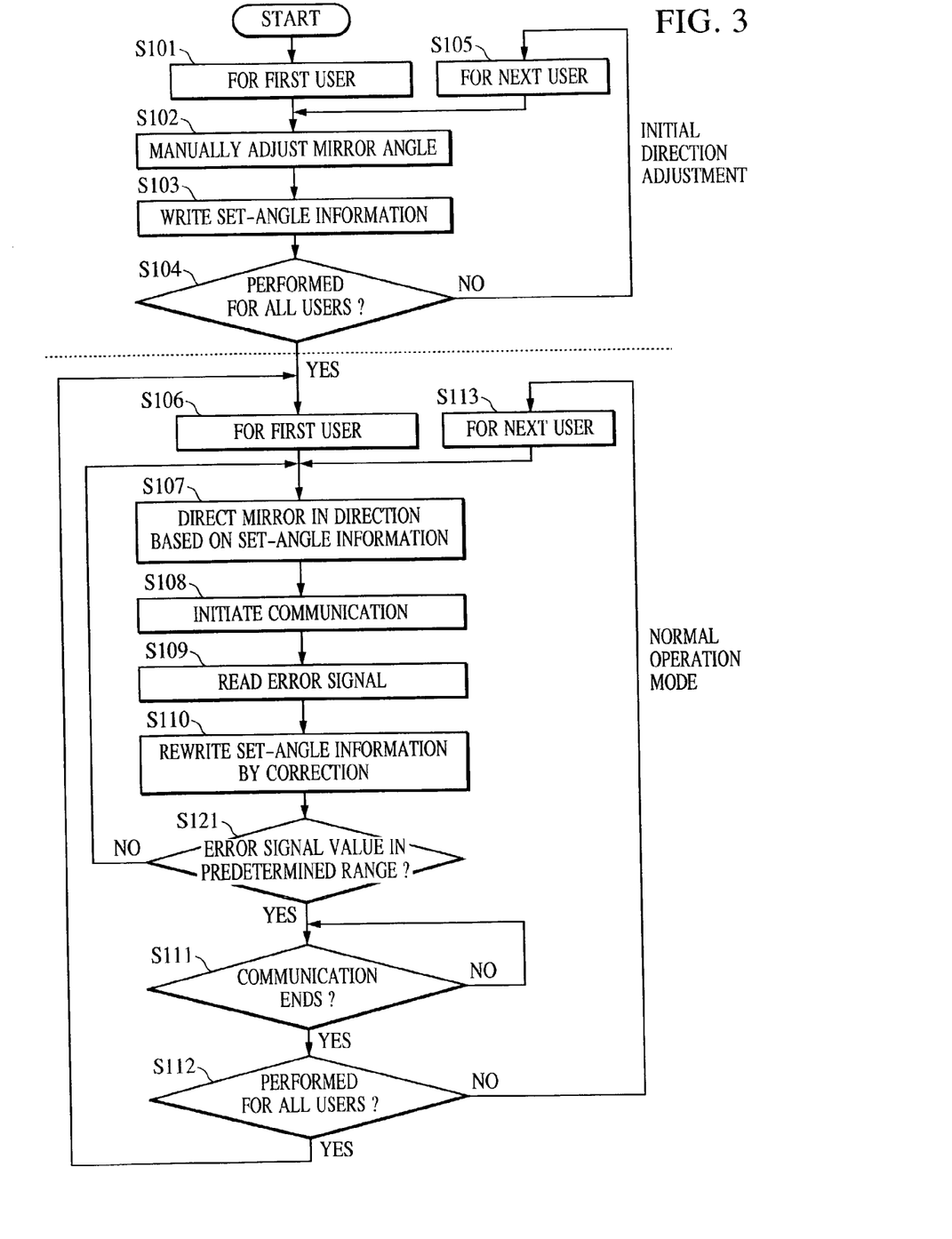
FIG. 3 is a flowchart showing a control process performed by a base apparatus included in a free-space optical communication system according to a second embodiment of the present invention.

FIG. 3 is a flowchart showing a control process performed by an base apparatus included in a free-space optical communication system according to a second embodiment of the present invention.

Initial setting on the mirror angle in the setting of the apparatus 10 is similar to that in the first embodiment. However, in the first embodiment, if the posture of the apparatus 10 changes due to external force, etc., in the normal operation mode, actual correction of the mirror 24 is not performed until the next scanning of each user. Thus, the communication condition may depart from the optimal condition when the apparatus 10 has a large posture change.

Accordingly, in the second embodiment, when the error signal is large and exceeds a predetermined range, driving (i.e., the automatic tracking operation) for correcting the angle of the mirror 24 for a user with which the apparatus 10 is communicating is immediately performed (fist control mode). After ending the communication, scanning of the next user is initiated.

Steps of the control process in FIG. 3 are identical to those in the first embodiment up to step S110 "REWRITE ANGLE-SETTING INFORMATION BY CORRECTION". However, the process determines whether or not the error signal is within the predetermined range (step S121). When the error signal is out of the predetermined range, the process proceeds to step S107, and enters the first control mode in which the driving for correcting the angle of the mirror 24 is immediately performed.

When the error signal is within the predetermined range, as described in the first embodiment, correction of the angle-setting information is performed, and in the next scanning operation, the mirror 24 is driven to an angle corresponding to the corrected angle-setting information (second control mode).

In the second embodiment, activation of the first control mode increases the time required for scanning all the users because driving for correcting the angle of the mirror 24 is performed for each user. However, it is not likely that the error signal may frequently exceed the predetermined range due to a large change in the posture of the apparatus 10. Thus, it is ensured that communication is continued while normally maintaining high scanning speed, even if the posture of the apparatus 10 greatly changes.

Third Embodiment

Although the second embodiment has described a case in which the first control mode or the second control mode is automatically selected by the control circuit 28 based on whether or not the error signal is out of the predetermined range, the first control mode or the second control mode may be selected, as required, by a user's operation.

This makes it possible to freely give higher priority either on the use of the first control mode to always communicate with each user at the optimal mirror angle, or on the use of the second control mode to perform high speed scanning without preventing each user from being aware of any delay, whereby flexibility in operating the free-space optical communication system can be enhanced.

Fourth Embodiment

Each of the above embodiments has described a case in which the angle-setting information for the mirror 24 is corrected based on a position of the optical position detector 27 in which the optical beam from each of the apparatuses 11a to 11c is received. However, the angle-setting information for the mirror 24 may be corrected based on a position on the optical position detector 27 at which a beam generated by reflection of the optical beam 12 (sent from the apparatus 10) by a reflecting member in each apparatus after is received.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A free-space optical communication apparatus for selectively performing wireless optical communication with a plurality of other free-space optical communication apparatuses by changing the angle of a light beam reflecting mirror, said free-space optical communication apparatus comprising:

storage means which stores angle-setting information for the mirror for communicating with each of the plurality of other apparatuses;

mirror driving means which drives the mirror to an angle corresponding to the stored angle-setting information;

optical detecting means which, on repeated occasions for communicating with a specified communication apparatus among the plurality of other apparatuses, detects the incident state of a light beam sent from the specified apparatus; and control means which, for each repeated occasion and based on the detected incident state of the light beam, determines angle-correcting information for correcting the stored angle-setting information for the specified apparatus, wherein on the next occasion for communicating with the specified apparatus, after each repeated occasion, said control means uses said mirror driving means to drive the mirror to an angle corresponding to the angle-setting information corrected by the angle-correcting information.

2. A free-space optical communication apparatus according to claim 1, wherein, when the angle-correcting information represents an amount of correction which is out of a predetermined range, said control means controls said mirror-driving means to drive the mirror to the angle corresponding to the angle-setting information corrected by the angle-correcting information on said one occasion for communicating with said specified apparatus.

3. A free-space optical communication apparatus according to claim 1, wherein said optical detecting means detects, with respect to a predetermined reference position, a position at which the light beam sent from said specified apparatus is incident.

4. A free-space optical communication apparatus according to claim 1, wherein said control means controls said mirror driving means to drive the mirror so that said free space optical communication apparatus can communicate with the plurality of other apparatuses cyclically or in a predetermined order.

5. A free-space optical communication system comprising:

a free-space optical communication apparatus as set forth in claim 1; and a plurality of other apparatuses with which said free-space optical communication apparatus can communicate by using a light beam.

6. A free-space optical communication apparatus for selectively performing wireless optical communication with a plurality of other free-space optical communication apparatuses by changing the angle of a light beam reflecting mirror, said free-space optical communication apparatus comprising:

storage means which stores angle-setting information for the mirror for communicating with each of the plurality of other apparatuses;

mirror driving means which drives the mirror to an angle corresponding to the stored angle-setting information;

optical detecting means which, on one occasion for communicating with a specified communication apparatus among the plurality of other apparatuses, detects the incident state of a light beam sent from said specified apparatus; and control means which, based on the detected incident state of the light beam, determines angle-correcting information for correcting the stored angle-setting information for said specified apparatus, and which, uses said mirror driving means to drive the mirror to an angle corresponding to the angle-setting information corrected by the angle-correcting information, wherein said control means has a first control mode in which, on said one occasion for communicating with said specified apparatus, said mirror driving means is controlled to drive the mirror to an angle corresponding to the angle-setting information corrected by the angle-correcting information, and a second control mode in which, on the next occasion for communicating with said specified apparatus, said mirror driving means is controlled to drive the mirror to an angle corresponding to the angle-setting information corrected by the angle-correcting information, and wherein said control means switches between the first control mode and the second control mode automatically based on a predetermined criterion.

7. A free-space optical communication apparatus according to claim 6, wherein said optical detecting means detects, with respect to a predetermined reference position, a position at which the light beam sent from said specified apparatus is incident.

8. A free-space optical communication apparatus according to claim 6, wherein said control means controls said mirror driving means to drive the mirror so that said free-space optical communication apparatus can communicate with the plurality of other apparatuses cyclically or in a predetermined order.

9. A free-space optical communication system comprising:

a free-space optical communication apparatus as set forth in claim 6; and a plurality of other apparatuses with which said free-space optical communication apparatus can communicate by using a light beam.

* * * * *

UNITED STATES PATENT AND TRADEMARK OFFICE
CERTIFICATE OF CORRECTION

PATENT NO. : 7,058,307 B2  Page 1 of 1
APPLICATION NO. : 10/226320
DATED : June 6, 2006
INVENTOR(S) : Tetsuo Sakanaka It is certified that error appears in the above-identified patent and that said Letters Patent is hereby corrected as shown below:

Column 2:

Line 32, "of an" should read --of a--.
Line 66, "between an" should read --between a--.

Column 3:

Line 62, "delay" should read --delay.--.

Column 7:

Line 4, "an" should read --a--.
Line 19, "(fist" should read --(first--.

Signed and Sealed this

Twenty-fourth Day of July, 2007

JON W. DUDAS
*Director of the United States Patent and Trademark Office*